(12) United States Patent
Dufrene et al.

(10) Patent No.: US 8,744,054 B2
(45) Date of Patent: Jun. 3, 2014

(54) METHOD AND SYSTEM FOR AUTOMATIC CALL REDIALING

(75) Inventors: Rene Dufrene, Rowlett, TX (US); Eric Bernier, Kanata (CA)

(73) Assignee: Apple Inc., Cupertino, CA (US)

( * ) Notice: Subject to any disclaimer, the term of this patent is extended or adjusted under 35 U.S.C. 154(b) by 2669 days.

(21) Appl. No.: 11/477,964

(22) Filed: Jun. 29, 2006

(65) Prior Publication Data
US 2008/0037746 A1 Feb. 14, 2008

(51) Int. Cl.
H04M 3/42 (2006.01)
G06F 15/16 (2006.01)
H04N 7/14 (2006.01)

(52) U.S. Cl.
USPC ............ 379/201.01; 379/203.01; 379/204.01; 379/205.01; 379/207.02; 455/416; 709/204; 348/14.08; 348/14.09

(58) Field of Classification Search
USPC ........ 455/416, 412.1, 519; 379/201, 203, 204
See application file for complete search history.

(56) References Cited

U.S. PATENT DOCUMENTS

| | | | |
|---|---|---|---|
| 4,481,383 A * | 11/1984 | Madon | 379/115.01 |
| 5,361,295 A | 11/1994 | Solomon et al. | |
| 5,809,128 A | 9/1998 | McMullin | |
| 5,889,774 A | 3/1999 | Mirashrafi et al. | |
| 5,930,700 A | 7/1999 | Pepper et al. | |
| 5,999,611 A | 12/1999 | Tatchell et al. | |
| 6,041,114 A | 3/2000 | Chestnut | |
| 6,064,653 A | 5/2000 | Farris | |
| 6,134,235 A | 10/2000 | Goldman et al. | |
| 6,163,692 A * | 12/2000 | Chakrabarti et al. | 455/416 |
| 6,324,280 B2 | 11/2001 | Dunn et al. | |
| 6,400,817 B1 | 6/2002 | Su et al. | |
| 6,421,339 B1 | 7/2002 | Thomas | |
| 6,445,694 B1 | 9/2002 | Swartz | |
| 6,449,259 B1 | 9/2002 | Allain et al. | |
| 6,510,217 B1 | 1/2003 | Welch et al. | |
| 6,674,746 B1 | 1/2004 | Lamarque | |
| 2004/0141605 A1 * | 7/2004 | Chen et al. | 379/202.01 |
| 2004/0235509 A1 * | 11/2004 | Burritt et al. | 455/519 |
| 2005/0008003 A1 * | 1/2005 | Ramey et al. | 370/352 |
| 2005/0233736 A1 * | 10/2005 | Berstis et al. | 455/416 |

* cited by examiner

Primary Examiner — Joseph J Nguyen
(74) Attorney, Agent, or Firm — Meyertons, Hood, Kivlin, Kowert & Goetzel P.C.

(57) ABSTRACT

Methods and systems for reestablishing voice communications in the event of a service interruption. The method comprises establishing a call session with a user via a communication device, storing call state and bridge information associated with the call session, determining that the call session has been disconnected, and maintaining the call state and bridge information associated with the call session and redialing for the disconnected user. The method may further include providing an audio message to other call participants.

15 Claims, 3 Drawing Sheets

METHOD AND SYSTEM FOR AUTOMATIC CALL REDIALING

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to the field of networking communications and, more particularly, to methods and systems for reestablishing calls in the event of a service interruption.

BACKGROUND OF THE INVENTION

The rapid growth of Wireless Local Area Network (WLAN) deployments in enterprises, hotspots and homes, the improving ability of WLAN access to provide high-quality voice service and the introduction of dual mode handsets that can support both cellular (Global System for Mobile Communications (GSM), Universal Mobile Telecommunications (UMTS) or Code Division Multiple Access (CDMA)) and WLAN radio have created the need for comprehensive services that converge mobile and fixed-line infrastructures, beginning with voice. One approach to converging mobile and fixed-line infrastructure uses a standardized Next Generation Networking (NGN) architecture called IP Multimedia Subsystem (IMS). IMS uses a Voice-over-IP (VoIP) implementation based on a $3^{rd}$ Generation Partnership Project (3GPP) standardized implementation of Session Initiation Protocol (SIP), and runs over the standard Internet Protocol (IP). Voice Call Continuity (VCC) extends an IMS network to cellular coverage and addresses handover. IMS-VCC provides seamless voice call continuity between the cellular domain and any IP-connectivity access networks that support VoIP.

Although the use of WLAN, cellular, and desktop systems to support voice call sessions has provided greater mobility and flexibility however, these technologies have also increased the number of service interruptions (e.g., dropped calls) resulting in an overall decreased system reliability. A service interruption or "dropped call" continues to be the most frustrating experience for most users. Typically, a user experiencing a dropped call will attempt to redial manually which can be difficult if the user is driving. Although a device redial feature may be available, low signal strength may require the user to depress this key multiple times before successfully reestablishing a call, if at all. Service interruptions are also a nuisance in the conference call setting when using a traditional public switched telephone network (PSTN). Such a traditional conference call setting may be supported by a communication center in which various participants are calling a conference call dial-in number in order to be placed into the conference call. When a service interruption occurs for one of the participants, the participant will have to redial the conference call dial-in number, enter any passcodes or the like, all in an attempt to re-enter the conference call session.

When these types of technologies are utilized to establish an important call (such as dialing into a conference bridge or calling a customer), there is a need for a call processing feature to minimize the amount of time a user is not on the call in the event of a service interruption. Therefore, a need exists for automatic redialing call feature management systems and methods that address and solve the aforementioned problems.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention advantageously provides methods and systems for reestablishing voice communications in the event of a service interruption.

One aspect of the present invention is a method for reestablishing a disconnected call session. The method comprises establishing a call with a user via a communication device; storing call state and bridge information associated with the call session, determining that the call session has been disconnected and maintaining the call state and bridge information for redialing the user. The method may further include providing an audio message to other call participants, terminating redialing after a selected amount of time, notifying other call session participants of terminating the redialing, and purging call state and bridge information for the user for whom the call session was disconnected. Alternatively, the method can include the steps of reconnecting the user to the call session and notifying other call session participants of the successful reconnection of the user.

According to another aspect of the present invention, an apparatus for reestablishing a disconnected call session is provided. The apparatus includes a memory for storing call state and bridge information associated with the call session, and a processor to determine if a call session has been disconnected, where the processor maintains call state and bridge information, and may commence an attempt to reconnect the user to the call session.

According to yet another aspect, the present invention provides a storage medium to store a computer program which when executed by a processing unit performs a method for reestablishing a disconnected conference call. The method comprises establishing a call with a user via a communication device, determining that a call session has been disconnected, and maintaining the call state and bridge information and redialing the user. The method may further include providing an audio message to other call participants, and terminating the redialing after a certain number of redial attempts or a certain period of time.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention. The embodiments illustrated herein are presently preferred, it being understood, however, that the invention is not limited to the precise arrangements and instrumentalities shown, wherein.

DETAILED DESCRIPTION OF THE INVENTION

The use of WLAN, Cellular, and desktop computer systems to support voice call sessions has created a number of challenges from a reliability perspective. Primarily, while these technologies provide mobility and flexibility, they also increase the number of service interruptions (e.g., dropped calls). When these types of technologies are utilized to establish an important call (e.g., dialing into a conference bridge or calling a client), there is a need for a call processing feature that minimizes the amount of time a user is not on the call due to a service interruption.

Figure 1:
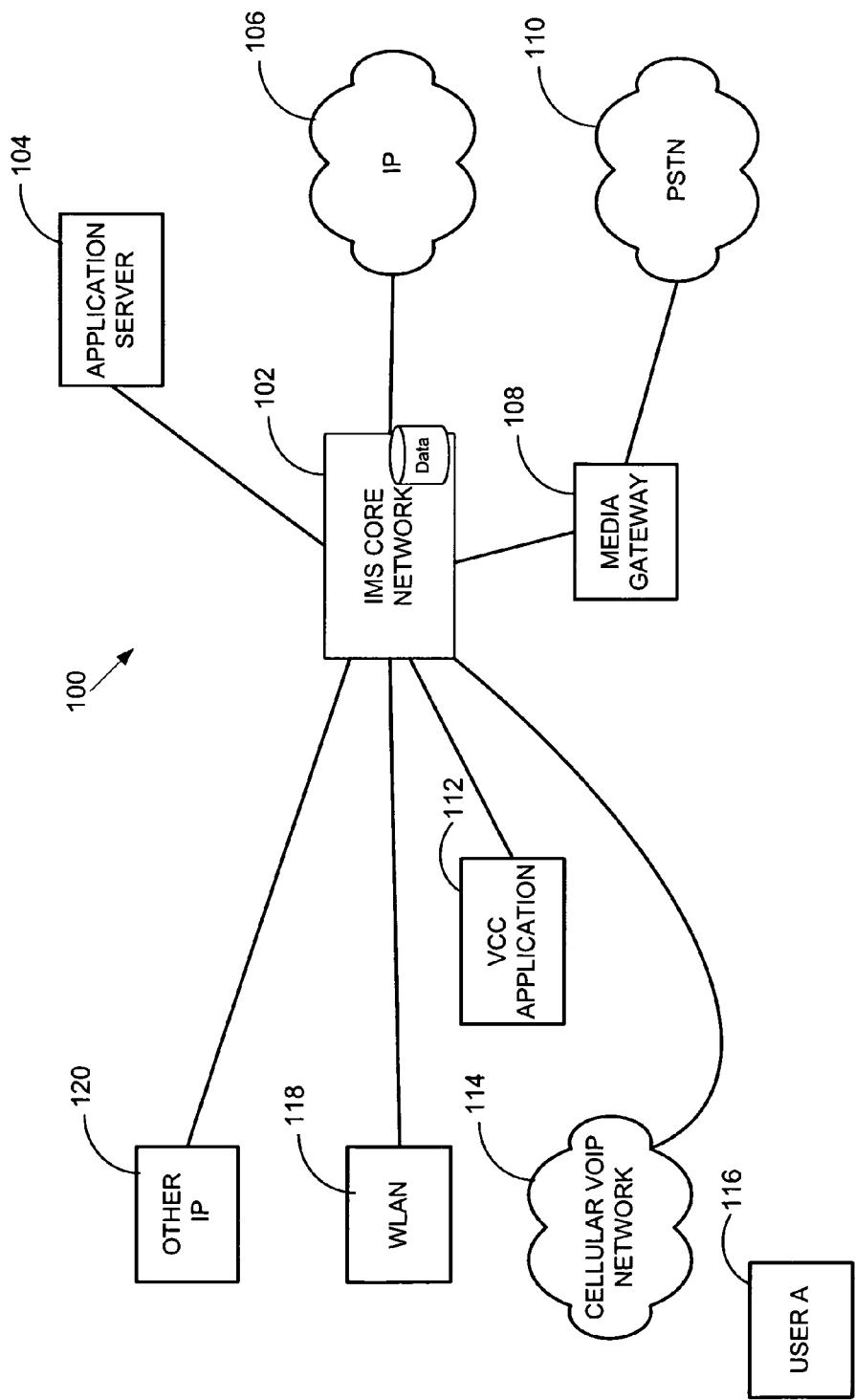
FIG. 1 is a block diagram of a multiservice network according to one embodiment of the present invention.

Referring first to FIG. 1, an exemplary embodiment provides a system for reestablishing voice communications in the event of a service interruption. As illustrated in FIG. 1, a networking system 100 includes an IMS core 102, an Application Server (AS) 104, and a Voice Call Continuity (VCC) application 112. The IMS core 102 interfaces with various other networks including the IP network 106, a Public Switched Telephone Network (PSTN) 110 via a media gateway (MGW) 108, a cellular VoIP network 114, a WLAN 118 and numerous other IP networks and devices 120. In this embodiment, the User A 116 may make use of the cellular VoIP network 114 to initiate a call, join a conference call or the like.

The IMS core 102 provides an operator-friendly environment for real-time, packet-based calls and services. As an architecture, the IMS core 102 decomposes current and future networking devices into a plethora of functions, joined to one another conceptually by reference points. Reference points describe all the traffic between two resources, including multiple protocols for the different types of traffic. Central to the IMS core 102 is the Call Session Control Function (CSCF), and its further decomposition into Interrogating, Serving and Proxy Session Control Functions. In IMS, every user signaling event—be it feature activation, call session initiation, resource allocation, or requests for any other application or service—first stops at the Proxy CSCF (P-CSCF), which is the user device's first contact point within the IMS core network.

The P-CSCF forwards SIP messages received from the User Equipment to the Interrogating Call Session Control Function (I-CSCF) and/or the Serving Call Session Control Function (S-CSCF), depending on the type of message and procedure. The I-CSCF provides a contact point within an operator's network allowing subscribers of that network operator, and roaming subscribers, to register. Once registered, the S-CSCF maintains session state for all IMS services. The IMS core 102 communications with the application server 104 to initiate various applications, which may include the VCC 112. The VCC application 112 extends an IMS network to cellular coverage and addresses handover. VCC 112 provides seamless voice call continuity between the cellular domain and any IP-connectivity access networks that support VoIP. VCC 112 provides for the use of a single phone number (or SIP identity) as well as handover between WLAN and cellular. In this embodiment of the system, the VCC 112 can maintain the status of the user call state and bridge information for use with the automatic redial call feature.

The media gateway 108 converts the PSTN time division multiplexing (TDM) voice bit stream to an IP real-time transport protocol (RTP) for use by the IMS core 102. Of course the media gateway 108 also converts the IP RTP packets to the voice bit stream for the PSTN 110.

In general, the automatic redialing feature of the present invention provides the ability to automatically redial a user, in the event that a call is terminated abnormally or interrupted (e.g., without a "Disconnect Message" being received by the communication system). Additionally, the automatic redialing feature provides the ability to identify and prioritize alternative redial origination terminals in the event of a dropped call.

Another function of the automatic redialing feature includes the ability to automatically redial multiple times until the successful re-establishment of the call session. For example, if a call was dropped on a cellular phone due to signal strength, this feature enables redial attempts for a pre-determined number of times or pre-determined time period until successful.

Figure 2:
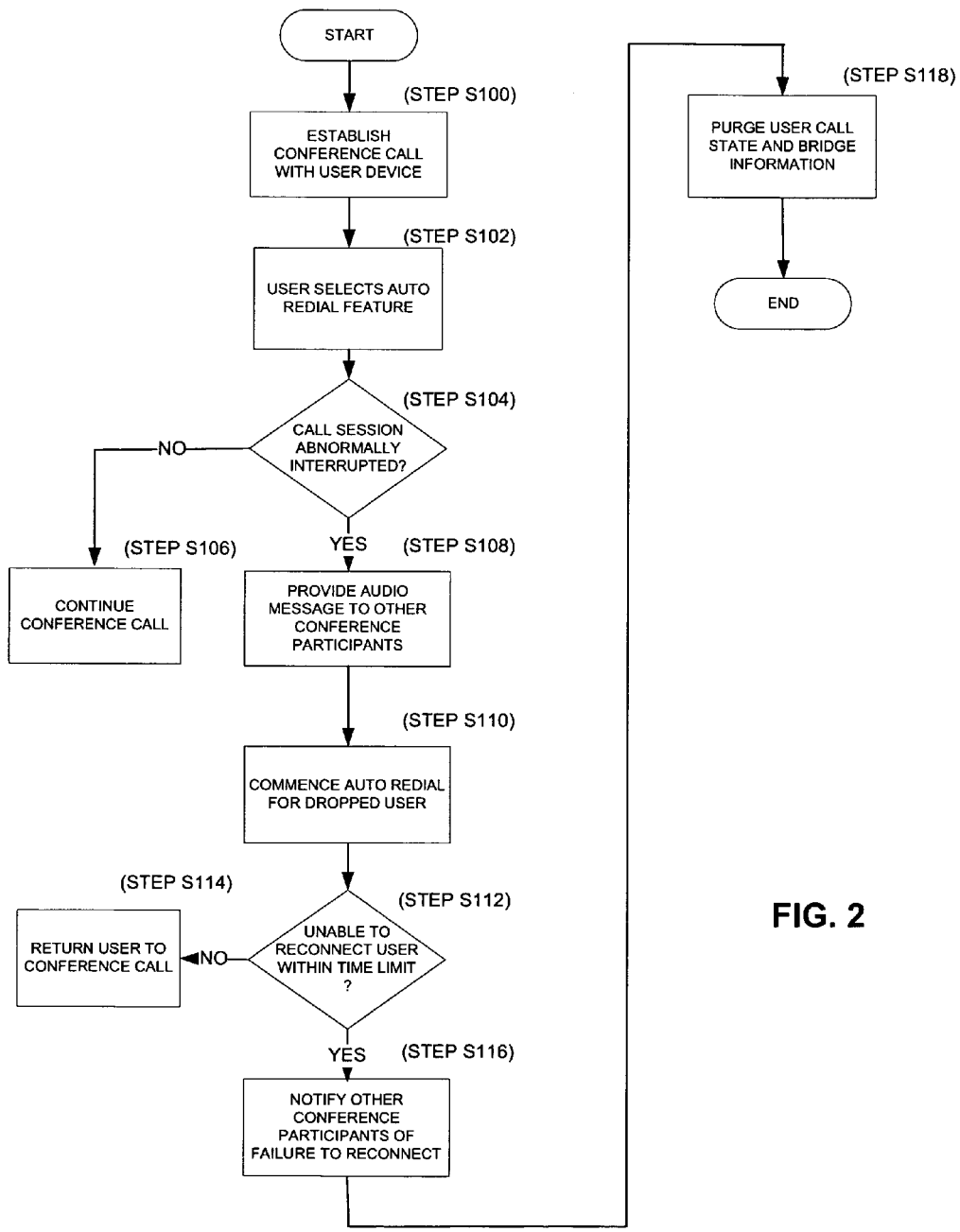
FIG. 2 is a diagram illustrating a process flow through the network of FIG. 1 according to one embodiment of the present invention.

An exemplary operation of the automatic redialing feature of the present invention is described with reference to the flowchart of FIG. 2. As shown in FIG. 2, a conference call is established with a communication device of a User A 116 and anchored at the VCC application 112 via step S100. The VCC application 112 maintains the status of the call state of User A 116 and all corresponding conference bridge information. In this embodiment, User A 116 has the option of invoking the use of the automatic redialing feature at step S102. Alternatively, the party responsible for the call session or conference call may decide to invoke the use of the automatic redialing feature for all call session or conference call participants based on one or more criteria such as premium payment, caller status, caller priority and the like. Moreover, the use of the automatic redialing feature could be a default condition for all call session or conference call participants.

At step S104, the system determines if the call session was abnormally interrupted for any of the conference call participants. If no abnormally interrupted call session is detected, the conference call continues in step S106. However, if an abnormally interrupted call session is detected, the user is identified and at optional step S108, an audio message may be provide to the remaining conference call participants that the "dropped" user is no longer on the conference call. For example, an audio message stating that "User A will be reconnected immediately" or "User A is no longer on the call, attempts to reestablish the connection are in progress." In this embodiment, the auto redial is commenced for the "dropped" user (User A) at step S110. In certain circumstances, the automatic redialing feature may limit the reconnection to the originating communication terminal (client based) or may provide for reconnection to a different communication terminal (networked based). For example, if a call is made from a PC (via a desktop client like Multimedia Communication Server (MCS)) and the PC crashes resulting in a dropped call, then the redial feature may select the desktop phone instead of attempting to redial the MCS client. In this regard, the connection or reconnection can be manually initiated by the user or can be via an automatic transfer from the call originating device, such as the PC.

In order to properly process the reconnection or redial attempts, the call-back information is stored in a database that may reside in an IMS core database unit or the call-back information may reside on the application server 104, or any network device having storage memory and/or a central processing unit (CPU). The call-back information can be pre-stored in the system or the call-back information can be entered by the user at the time of the call. For example, a client may have a policy that all employees will invoke the automatic redialing feature for all conference calls, and therefore must provide the call-back information prior to initiating or participating on any company conference calls. In such a case, the call back information would be prestored and ready for use in the event the user has a call session abnormally interrupted or disconnected.

Alternatively, or additionally, if a call originated from a cell phone, then the call manager could attempt to re-establish the call on that cell phone or on another that is available for such circumstances. The automatic redialing feature can enable one or more alternative devices to be introduced and prioritized as call originators.

If the communication with User A 116 is successfully reestablished, then User A 116 may rejoin the conference call at step S106 and another optional audio message may be played to the other conference call participants announcing that User A 116 has been successfully reconnected to the conference call. On the other hand, if the automatic redialing feature is unsuccessful in reconnecting the User A 116 to the conference call within a preset time limit or a preset number of reconnect attempts, another optional audio message may be played to the other conference call participants announcing that the system was unable to reconnect User A 116 to the conference call (step S116).

Upon the failure to reconnect User A 116 to the conference call, the user's call state and bridge information may be purged by the system via step S118. One of the advantages of the automatic redialing feature of the present invention is that the call state information (e.g., a dial-in bridge number, a dial-in conference number, a passcode, and the like) and the conference bridge information (e.g., a numerical command to identify the user's authorization or identification and the like) are maintained while attempts to reconnect the dropped user are invoked. This minimizes the reconnect time as the user does not have to depress any keys, nor input any commands, such as bridge identifiers and passcodes in an attempt to reconnect to the conference call.

Figure 3:
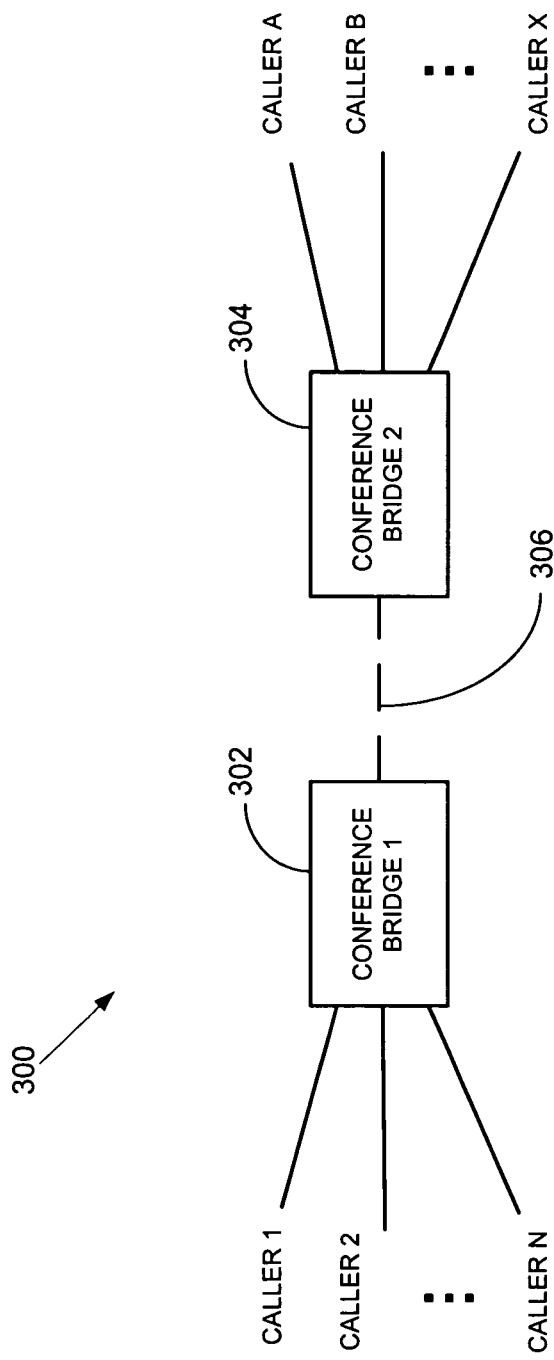
FIG. 3 is a block diagram of a peer-to-peer conference bridge architecture.

FIG. 3 illustrates a peer to peer bridge architecture generally designated as 300. The peer to peer bridge architecture 300 includes a first conference bridge 302 and a second conference bridge 304 which may interface with each other via communication link 306. In this embodiment, multiple callers 1 through N are linked to the first conference bridge 302, while multiple callers B through X are linked to the second conference bridge 304. Accessing a conference call may be accomplished by entering the bridge's telephone number, entering the respective conference call number, entering an optional passcode, and entering the user's participation code. If a user is the administrator of the conference call, then that user will authorize the commencement of the conference call. The other users, who are mere participants can not commence the conference call, and must wait for the administrator to commence the conference call.

In the event that one of the multiple callers 1 through N and B through X are abnormally disconnected from a conference call, the automatic redialing feature of the present invention may be invoked in several ways. One example is where the automatic redialing feature is invoked by one or both of the conference bridges (302, 304). In another embodiment, the automatic redialing feature of the present invention may be invoked by the communication device of the user or it may be invoked by a combination of conferences bridges and communication devices. In some situations, it may be advantageous to have the automatic redialing feature invoked by the communication device of the user as this would force the user to pay for any toll charges that the attempts to reestablish connection to the conference call. This may be more relevant if there is a third party enterprise that is supplying the conferencing service to a user and the other party (that initiated the conference call).

In another embodiment, one of the peer-to-peer bridges could initiate the automatic redialing feature of the present invention and that bridge may or may not alert the other peer-to-peer bridges that a user was dropped from the call.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for reestablishing a disconnected call session, the method comprising:
    establishing a call session with a user via a communication device using one of a cellular network and an Internet Protocol (IP) network;
    storing call state and bridge information associated with the call session;
    determining that the call session has been disconnected;
    maintaining the call state and the bridge information;
    redialing the user to reestablish the disconnected call session over the other of the cellular network and the Internet Protocol (IP) network;
    terminating redialing after a selected amount of time; and
    notifying other call session participants of terminating the redialing.

2. The method of claim 1, further comprising providing an audio message to other call participants.

3. The method of claim 1, further comprising purging call state and bridge information for the user for whom the call session was disconnected.

4. The method of claim 1, further comprising terminating redialing after a selected number of attempts.

5. The method of claim 1, further comprising reconnecting the user to the call session.

6. The method of claim 1, wherein the redialing the user is invoked by a conference bridge.

7. The method of claim 1, wherein the establishing a call session includes determining if the user has selected an auto redial feature.

8. An apparatus for reestablishing a disconnected call session, the apparatus comprising:
- an Internet Protocol multimedia subsystem that couples an Internet Protocol (IP) network, a public switched telephone network (PSTN) and a cellular voice over IP network;
- a memory for storing call state and bridge information associated with a call session; and
- a processor for determining if a call session has been disconnected, the processor maintaining the call state and the bridge information and commencing an attempt to reconnect the user to the call session over a different network than the original connection network, the processor terminating redialing after a selected amount of time, and notifying other call session participants of terminating the redialing.

9. The apparatus of claim 8, the processor further comprising providing an audio message to other call session participants.

10. The apparatus of claim 8, the processor further comprising terminating redialing after a selected number of attempts.

11. The apparatus of claim 10, the processor further comprising purging call state and bridge information for the user for whom the call session was disconnected.

12. A non-transitory storage medium storing a computer program which when executed by a processing unit performs a method for reestablishing a disconnected conference call, the method comprising:
- establishing a call session with a user via a communication device using one of a cellular network and an Internet Protocol (IP) network;
- storing call state and bridge information associated with the call session;
- determining that the call session has been disconnected;
- maintaining the call state and the bridge information; and
- redialing of the user to reestablish the disconnected call session over the other of the cellular network and the Internet Protocol (IP) network;
- terminating redialing after a selected amount of time and
- notifying other call session participants of terminating the redialing.

13. The non-transitory storage medium of claim 12, wherein the method further comprises providing an audio message to other call participants.

14. The non-transitory storage medium of claim 12, wherein the method further comprises purging call state and bridge information for the user for whom the call session was disconnected.

15. The non-transitory storage medium of claim 12, wherein the commencing redialing for the user is invoked by a conference bridge.

\* \* \* \* \*